United States Patent
Abhyanker

(10) Patent No.: US 8,064,590 B2
(45) Date of Patent: Nov. 22, 2011

(54) CAMPAIGN IN A GEO-SPATIAL ENVIRONMENT

(75) Inventor: Raj Vasant Abhyanker, Cupertino, CA (US)

(73) Assignee: Dealmap Inc., Mountain View, CA (US)

( * ) Notice: Subject to any disclaimer, the term of this patent is extended or adjusted under 35 U.S.C. 154(b) by 1183 days.

(21) Appl. No.: 11/731,489

(22) Filed: Mar. 29, 2007

(65) Prior Publication Data
US 2008/0243598 A1    Oct. 2, 2008

(51) Int. Cl.
*H04M 5/00* (2006.01)
*H04M 3/00* (2006.01)
*H04B 7/00* (2006.01)

(52) U.S. Cl. .............. 379/266.07; 379/242; 455/519

(58) Field of Classification Search .......... 379/266.07, 379/242, 207.12; 707/102, E17.14; 345/440; 455/519, 518
See application file for complete search history.

(56) References Cited

U.S. PATENT DOCUMENTS

| | | |
|---|---|---|
| 2002/0029163 A1 | 3/2002 | Joao |
| 2002/0029179 A1 | 3/2002 | Gruber et al. |
| 2002/0073026 A1 | 6/2002 | Gruber et al. |
| 2002/0194060 A1 | 12/2002 | Chernomorov |
| 2003/0208423 A1 | 11/2003 | Shotey et al. |
| 2005/0273804 A1 | 12/2005 | Preisman |
| 2006/0149620 A1 | 7/2006 | Reed et al. |
| 2008/0077642 A1* | 3/2008 | Carbone et al. .......... 707/E17.14 |
| 2008/0294678 A1* | 11/2008 | Gorman et al. ............... 707/102 |
| 2009/0284530 A1* | 11/2009 | Lester et al. ................... 345/440 |

OTHER PUBLICATIONS

Following the Dollars: Map Political Campaign Contributions in Your Area, http://www.cs.indiana.edu/~markane/i590/contributors.html, submitted on Jun. 28, 2007.
Fundcare 2004: Neighbor search, http://www.fundrace.org/neighbors.php.
Social Network Fundraising—a new (old) approach?, http://www.fundraisinginnovation.com/?p=5, Feb. 20, 2005, Submitted on Jun. 28, 2007.

* cited by examiner

*Primary Examiner* — Thjuan K Addy

(57) ABSTRACT

A method, apparatus, and system of a campaign in a geo-spatial environment is proposed. In one embodiment, a method includes populating each profile of a geo-spatial social network with an address data, forming a group in support of a campaign in the geo-spatial network when a particular user creates the group in support of the campaign and automatically communicating media to a physical location of a member of the group based on the address data associated with each profile of the geo-spatial network. The method may also include automatically creating the group based on a public data associated with each profile of the geo-spatial social network even prior to certain users associated with each profile registering geo-spatial social network by applying the public data to the each profile.

19 Claims, 14 Drawing Sheets

| USER 902 | ADDRESS 904 | GROUP NAME 906 | SUPPORTING THE GROUP 908 | MEDIA DELIVERED 910 | CHATS 912 | COMMENTS/ REMARKS 914 | EXIT POLL 916 |
|---|---|---|---|---|---|---|---|
| JOY | PALO ALTO, CA joy@gmail.com | POLITICIAN A | BLUE PARTY | LAWN SIGN, BROCHURE, FLYER | "HI" | POLITICIAN A DOING WELL | YES |
| STEVE | CUPERTINO, CA steve@yahoo.com | POLITICIAN B | GREEN PARTY | MAILER, POSTCARD, BROCHURE | "HOW ARE YOU" | POLITICIAN B NEEDS TO IMPROVE | NO |
| ••• | ••• | ••• | ••• | ••• | ••• | ••• | ••• |

FIGURE 9

CAMPAIGN IN A GEO-SPATIAL ENVIRONMENT

FIELD OF TECHNOLOGY

This disclosure relates generally to the technical fields of communications and, in one example embodiment, to a method, apparatus, and system of a campaign in a geo-spatial environment.

BACKGROUND

A campaign may be defined as several related operations aimed at achieving a goal (e.g., having geographical and/or temporal constraints). The campaign may be organized for a variety of purposes and/or causes (e.g., a political campaign, a charitable campaign, a religious campaign, a fundraising campaign, etc.). For example, the campaign may involve a series of activities such as publicity, fundraising, marketing, debating, blogging, podcasting, speaking and/or voting.

A supporter (e.g., a political party member, a volunteer, a devotee, a special-interest member, etc.) who represents the campaign may walk door to door in neighborhoods (e.g., to homes and/or businesses) to garner support for the campaign from others. The supporter may walk for miles and may spend weeks gaining support (e.g., raising money) and/or delivering media (e.g., lawn signs, goods, mailers, flyers, emails etc.) in a neighborhood. This can be a time consuming and labor intensive process.

For example, Jane (e.g., the supporter) may volunteer for the campaign of a presidential candidate (e.g., Hillary Clinton, Rudy Giuliani, Barack Obama, etc.). Jane may spend many hours each day walking and/or communicating with neighbors around her and convincing them that they too should support the presidential candidate. Jane may keep a map of where she has walked before. Sometimes her walking map may not be updated accurately and she may walk down the same street multiple times.

Jane may also handwrite comments about experiences with neighbors that she has visited. Sometimes notes that Jane takes of neighbors may get misplaced. Jane may collect checks by hand from neighbors to raise money for the presidential candidate. She may manually submit checks every few weeks to a local campaign manager of the presidential candidate. Sometimes checks may get lost.

Jane may revisit homes of neighbors who have agreed to support the presidential candidate to deliver media (e.g., flyers, lawn signs, buttons, banners, collateral, etc.). This can be a time consuming process, as Jane may have to physically remember which houses wanted lawn signs and/or communicate this information to other supporters specializing in lawn sign delivery. When lawn signs are to be removed, Jane or other supporters of the presidential candidate may need to recall where the campaign placed lawn signs and pick them up to avoid littering fines.

Sometimes, the local campaign manager may not know where Jane has walked and may deploy another supporter to walk down the same streets that Jane has already walked. Valuable time may be lost through a duplication of efforts. Furthermore, information that Jane may have collected about neighbors she has visited (e.g., this neighbor Fred cursed at me and hates politics!) may not be disseminated to others.

SUMMARY

A method, apparatus and system of campaign in a geo-spatial environment is disclosed. In one aspect, a method includes populating each profile of a geo-spatial social network with an address data, forming a group in support of a campaign (e.g., a political campaign, a charitable campaign, a religious campaign, and/or a fundraising campaign) in the geo-spatial social network when a particular user creates the group in support of the campaign, and automatically communicating media (e.g., a lawn sign, a flyer, a mailer, a postcard, a brochure, a magazine, and/or a newsletter) to a physical location of a member of the group based on the address data associated with each profile of the geo-spatial social network.

The method may further include transforming each profile of the geo-spatial social network into a wiki profile in which any data in a particular profile is editable by any user of the geo-spatial social network until a particular user claims the particular profile at which time the particular profile becomes locked and the particular user who claims the particular profile decides who can view and/or edit the particular profile.

In addition, the method may include automatically creating the group based on a public data (e.g., a demographic data, a religion data, an ethnicity data, an interest data, a political affiliation data, an age data, a profession data, and/or a charitable contribution data) associated with each profile of the geo-spatial social network even prior to certain users associated with each profile registering in the geo-spatial social network by applying the public data to the each profile. The method may further include seeding the address data with a telephone directory data compiled from public sources prior to launching the geo-spatial social network so as to seed interaction between group members of the geo-spatial social network at launch of the geo-spatial social network through both electronic and direct mail distribution channels.

The method may also include generating an electronic walkable map of a neighborhood to illustrate where members of the group reside so that a supporter of the group can tag each home visited with meta-data in the walkable map through a mobile device and outputting the walkable map to a printing device in the geo-spatial social network. Furthermore, the method may include forming, in the walkable map, a set of markers that may indicate which particular residences and/or businesses are to have media delivered to them, based on a subscription data provided by the particular residences and/or businesses who have joined the group and elected to receive the media.

Additionally, the method may include creating a marker in a three-dimensional neighborhood map that may represent the group and/or which simultaneously may display the group along with other residences and/or businesses which surround a physical presence of the group. Also, the method may include automatically color coding a rooftop of a residence in the three-dimensional neighborhood map which represents an affiliation of the resident identified through the rooftop as being associated with the group.

The method may yet include enabling any user of the geo-spatial social network to change the group affiliation of an unregistered user of the social network until the unregistered user claims their profile. Moreover, the method may include enabling the particular user to visualize a unified view at a local street level, a neighborhood level, a city level, a county level, a state level, a regional level, a federal level, and/or a global level based on hue of a degree of strength of any particular affiliation based on a color gradient and mixing algorithm that may determine an average color balance based on a number of residents in a particular neighborhood subset.

Furthermore, the method may include generating an online debate between certain candidates in the campaign in multi-media form through a technique in which the users of the geo-spatial social network may share comments, thoughts and/or feedback on the certain candidates while the online debate occurs. In addition, the method may include generating a poll in the geo-spatial social network such that the users of the geo-spatial social network may exchange group opinions with each other and/or see real time poll standings during a live presentation of the online debate in the geo-spatial social network.

Also, the method may include syndicating results of the poll across traditional and/or web based media through a real simple syndication algorithm. Moreover, the method may include providing a fundraising tool in the geo-spatial social network to a candidate raising funds to supplement the campaign from supporters of the candidate. Additionally, the method may include generating a neighborhood competition view that illustrates the fundraising success of any candidate participating in the geo-spatial social network.

In another aspect, a system includes a campaign module to automatically generate a visualization of areas of a particular neighborhood in which support of a candidate is strongest and/or weakest based on a membership in a group associated with supporters of the candidate in the particular neighborhood and/or in surrounding neighborhoods, a communication module to allow members of the group to communicate with each other and/or the candidate through a debate forum, an online forum, a physical mail communication, and/or an electronic communications communication and a delivery module to coordinate fulfillment of the physical mail communication through a geo-spatial social network.

Furthermore, the system may include an audience module to pre-populate a set of wiki profiles with public data having location information of residents of the particular neighborhood such that communication occurs between residents of the particular neighborhood through the physical mail communication regardless of whether the residents join the geo-spatial social network.

In yet another aspect, a method includes populating political affiliation data in a social network using publicly available sources, enabling a candidate to create a campaign in the social network in which the candidate outreaches to users and/or non-users of the social network through the political affiliation data, forming a group of certain ones of the users of the social network who support the candidate and generating a live debate between the candidate and other candidates in the social network.

In addition, the method may include generating a fundraising campaign in the social network such that the users who are members of the group have a marker visible above their physical properties in a three dimensional geo-spatial view of their neighborhood that indicates an amount donated to the candidate and/or an affiliation with the campaign. Moreover, the method may include allowing a supporter of the candidate to create a survey during the live debate between the candidate and other candidates in the social network such that results from the survey are refreshed and/or viewable on each submission to the survey.

The methods, systems, and apparatuses disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 9 is a table view showing the details of the supporters of the candidate in the geo-spatial social network, according to one embodiment.

Figure 1:
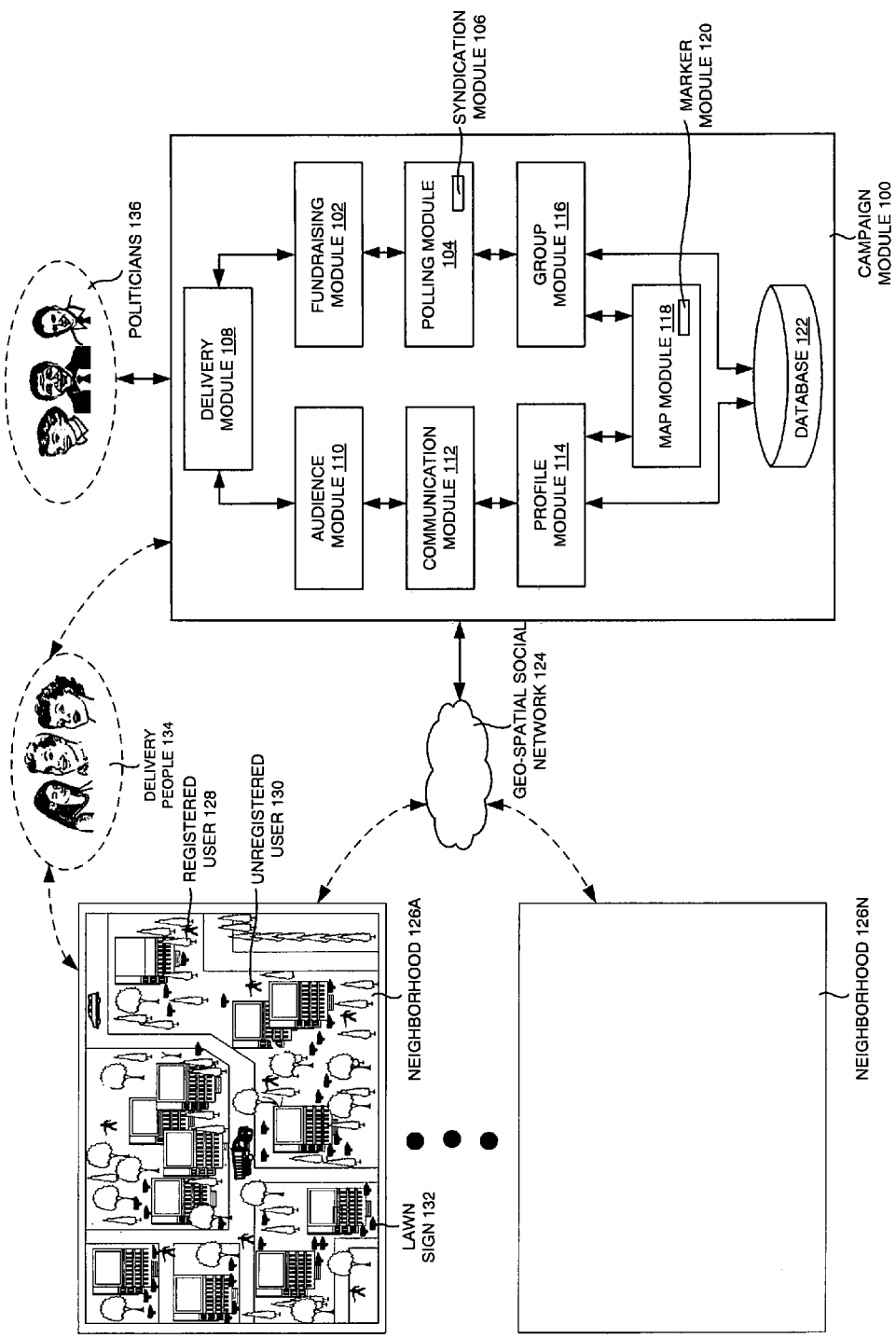
FIG. 1 is a system view of a campaign module communicating with a neighborhood through a geo-spatial social network, according to one embodiment.

Other features of the present embodiments will be apparent from the accompanying drawings and from the detailed description that follows.

DETAILED DESCRIPTION

A method, apparatus and system of campaign in a geo-spatial environment is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes populating each profile of a geo-spatial social network (e.g., the geo-spatial social network 124 of FIG. 1) with an address data, forming a group in support of a campaign in the geo-spatial social network when a particular user creates the group in support of the campaign and automatically communicating media to a physical location of a member of the group based on the address data associated with each profile of the geo-spatial social network 124.

In another embodiment, a system includes a campaign module (e.g., the campaign module 100 of FIG. 1) to automatically generate a visualization of areas of a particular neighborhood (e.g., the neighborhoods 126A-N of FIG. 1) in which support of a candidate (e.g., the politicians 136 of FIG. 1) is strongest and/or weakest based on a membership in a group associated with supporters of the candidate in the particular neighborhood and/or in surrounding neighborhoods, a communication module (e.g., the communication module 112 of FIG. 1) to allow members of the group to communicate with each other and/or the candidate (e.g., through a debate forum, an online forum, a physical mail communication, and/ or a electronic communications communication, etc.) and a delivery module (e.g., the delivery module 108 of FIG. 1) to coordinate fulfillment of the physical mail communication through the geo-spatial social network 124.

In yet another embodiment, a method includes populating political affiliation data in a social network using publicly available sources, enabling a candidate (e.g., the politicians 136 of FIG. 1) to create a campaign in the social network in which the candidate outreaches to users and/or non-users of the social network through the political affiliation data, forming a group of certain ones of the users of the social network who support the candidate and generating a live debate between the candidate and other candidates in the social network.

FIG. 1 is a system view of a campaign module 100 communicating with neighborhoods 126 A-N through a geo-spatial social network 124, according to one embodiment. Particularly, FIG. 1 illustrates the campaign module 100, a fundraising module 102, a polling module 104, a syndication module 106, a delivery module 108, an audience module 110, a communication module 112, a profile module 114, a group module 116, a map module 118, a marker module 120, a database 122, the geo-spatial social network 124, the neighborhood 126 A-N, a registered user 128, an unregistered user 130, a lawn sign 132, delivery people 134 and politicians 136, according to one embodiment.

The campaign module 100 may generate (e.g., automatically) a visualization of areas of a particular neighborhood 126A-N in which the support of a candidate is determined based on a membership in a group associated with supporters of the candidate in the particular neighborhood and in surrounding neighborhoods 126A-N. The fundraising module 102 may provide a fund raising tool in the geo-spatial social network 124 to supplement the campaign from the supporters of the candidate in the neighborhood 126A-N of the geo-spatial social network 124. In addition, the fundraising module 102 may generate a neighborhood competition between the fundraising candidates to determine the success of the any candidate participating in the geo-spatial social network 124.

The polling module 104 may generate a poll to allow the users to exchange group opinions with each other and/or may display the real time poll standings during a live online debate between the candidates in the geo-spatial social network 124. The syndication module 106 may syndicate results of the poll across traditional and/or web based media using a real simple syndication (e.g., RSS) algorithm. The delivery module 108 may synchronize fulfillment of a physical mail communication to a physical location of the member of the group based on address data associated with each profile of the geo-spatial social network 124. The audience module 110 may pre-populate a set of wiki profiles with public data associated with location information of residents of the particular neighborhood.

The communication module 112 may allow the members of the group to communicate with each other and/or the candidate through a debate forum, an online forum, a physical mail communication and/or an electronic communications communication. The profile module 114 may contain the set of wiki profiles and/or claimed profiles associated with the public data having the location information of residents of the particular neighborhood. The group module 116 may enable creation of the group in the geo-spatial social network 124 depending on the support of the users to the particular candidate.

The map module 118 may render a graphical unified view (e.g., at a local street level, a neighborhood level, a city level, a county level, a state level, a regional level, a federal level, and/or a global level, etc.) based on hue of a degree of strength of any particular affiliation (e.g., based on a color gradient and mixing algorithm that determines an average color balance based on a number of residents in a particular neighborhood subset). The map module 118 may also generate an electronic walkable map of the neighborhood to locate the physical location of the members graphically in the geo-spatial social network 124. The marker module 120 may create a marker in a three-dimensional neighborhood map that may indicate the group along with other residences and/or businesses in the neighborhood environment. The database 122 may contain the public data (e.g., a demographic data, a religion data, an ethnicity data, an interest data, a political affiliation data, an age data, a profession data, and/or a charitable contribution data) and/or the address data associated with the members of the group in the geo-spatial social network 124. The geo-spatial social network 124 may enable communication between the campaign module 100 and the members in the group in the neighborhood 126 A-N.

The neighborhood 126 A-N may be a geographically localized community located within a larger city, town and/or suburb, associated with the geo-spatial social network 124. The registered user 128 may be the user of the neighborhood environment who has claimed the profile associated with the physical location. The unregistered user 130 may be the user who may not have claimed the profile and may have wiki profile created by other registered user in the geo-spatial social network 124. The lawn sign 132 may be the media installed by the supporters of the candidate on a lawn of the member of the group who may have elected to receive the media. The delivery people 134 may communicate the media to the physical location of the member of the group associated with each profile of the geo-spatial social network. The politicians 136 may be an individual who is a formally recognized and/or a active member of a government involved in campaigning in the geo-spatial social network 124.

In the example embodiment illustrated in FIG. 1, the campaign module 100 includes the fundraising module 102, the polling module 104, the delivery module 108, the audience module 110, the communication module 112, the profile module 114, the group module 116, the map module 118 and the database 122 interacting with each other. The campaign module 100 communicates with the neighborhood 126A-N through geo-spatial social network 124. The delivery people 134 and the politicians 136 communicate with the campaign module 100, according to the example embodiment of FIG. 1. In addition, the delivery people 134 interact with the neighborhood 126A-N.

A group may be formed in support of a campaign (e.g., a political campaign, a charitable campaign, a religious campaign, and/or a fundraising campaign) in the geo-spatial social network 124 when the particular user creates the group in support of the campaign. In addition, media (e.g., the lawn sign, the news letter, etc.) may be communicated automatically to the physical location of the member of the group based on the address data associated with each profile of the geo-spatial social network 124.

Each profile of the geo-spatial social network 124 may be transformed into a wiki profile in which any data in a particular profile is editable by any user of the geo-spatial social network 124 until a particular user claims the particular profile, at which time the particular profile becomes locked and the particular user who claims the particular profile decides who can view and/or edit the particular profile.

The electronic walkable map of the neighborhood 126A-N may be generated to illustrate where members of the group reside, such that that supporters of the group can tag each home visited with meta-data (e.g., name, address, etc.) in the walkable map through a mobile device (e.g., mobile phone, PDA, etc.). Furthermore, the walkable map may be outputted to a printing device (e.g., a printer, a plotter, etc.) in the geo-spatial social network 124. A set of markers may be formed in the walkable map to indicate which particular residences and/or businesses are to have media (e.g., the lawn sign, a flyer, a mailer, a postcard, a brochure, a magazine, and/or the newsletter) delivered (e.g., by the delivery people 134 of FIG. 1) to them based on a subscription data provided by the particular residences and/or businesses who have joined the group and/or have elected to receive the media.

A marker (e.g., a pushpin, an indicator, etc.) may be created in the three-dimensional neighborhood map that represents the group and which simultaneously displays the group along with other residences and/or businesses which surround a physical presence of the group. Any user of the geo-spatial social network 124 may be enabled to change the group affiliation of the unregistered user 130 of the social network until the unregistered user 130 claims their profile. Also, the particular user may be enabled to visualize a unified view at the local street level, the neighborhood level, the city level, the county level, the state level, the regional level, the federal level, and/or the global level based on hue of the degree of strength of any particular affiliation based on the color gradient and mixing algorithm that determines the average color balance based on the number of residents in the particular neighborhood subset.

A poll may be generated in the geo-spatial social network 124 such that the users of the geo-spatial social network 124 exchange group opinions with each other and see real time poll standings during the live presentation of the online debate in the geo-spatial social network 124. Results of the poll may be syndicated across traditional and/or web based media through the real simple syndication (e.g., RSS) algorithm. Fundraising tools may be provided in the geo-spatial social network 124 to the candidate raising funds to supplement the campaign from supporters of the candidate. A neighborhood competition view may be generated to illustrate the fundraising success of any candidate participating in the geo-spatial social network 124.

The campaign module 100 may automatically generate visualizations of areas of the particular neighborhood (e.g., the neighborhood 126A-N of FIG. 1) in which support of a candidate is strongest and/or weakest based on the membership in the group associated with supporters of the candidate in the particular neighborhood and/or in surrounding neighborhoods. The communication module 112 may allow members of the group to communicate with each other and/or the candidate (e.g., through a debate forum, an online forum, a physical mail communication, and/or an electronic communication, etc.). The delivery module 108 may coordinate fulfillment of the physical mail communication through the geo-spatial social network 124.

The audience module 110 may pre-populate the set of wiki profiles with public data having location information of residents of the particular neighborhood (e.g., such that communication occurs between residents of the particular neighborhood through the physical mail communication regardless of whether the residents join the geo-spatial social network 124). The candidate may be enabled to create the campaign in the social network in which the candidate can reach out to users and/or non-users of the social network through the political affiliation data, and/or groups of users of the social network who support the candidate may be formed.

The fundraising campaign may be generated in the social network such that the users who are members of the group have a marker visible above their physical properties in a three dimensional geo-spatial view of their neighborhood (e.g., that indicates an amount donated to the candidate and/or an affiliation with the campaign). The supporter of a candidate may be allowed to create a survey during the live debate between the candidate and other candidates in the social network such that results from the survey are refreshed and/or viewable on each submission to the survey.

Figure 2:
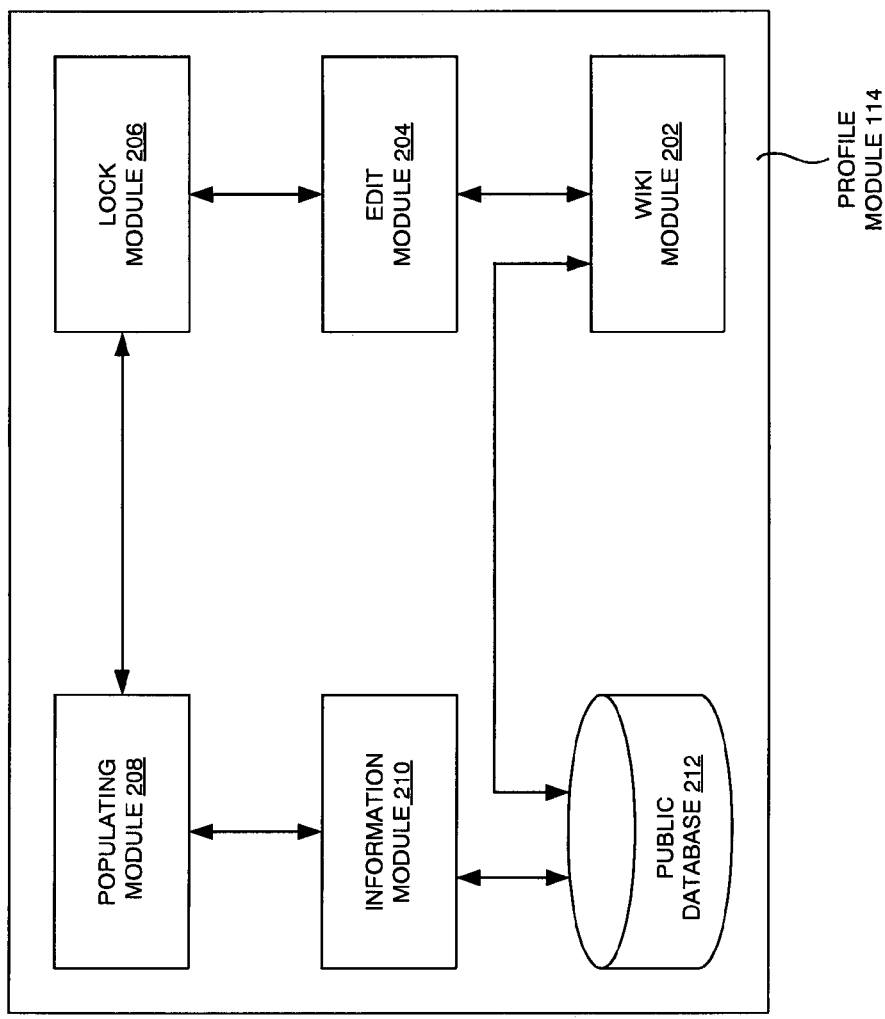
FIG. 2 is an exploded view of the profile module of FIG. 1, according to one embodiment.

FIG. 2 is an exploded view of the profile module 114 of FIG. 1, according to one embodiment. Particularly, FIG. 2 illustrates a wiki module 202, an edit module 204, a lock module 206, a populating module 208, an information module 210, a public database 212, according to one embodiment.

The wiki module 202 may enable users to create and/or update the wiki profiles of the users representing the group in the neighborhood. The edit module 204 may track and save the edits made in the wiki profile by any user in the neighborhood. The lock module 206 may lock the profile of the users after the profile is claimed by the particular user. The populating module 208 may populate the data associated with the profiles in the geo-spatial social network.

The information module 210 may generate information associated with the address data of the users in the neighborhood. The public database 212 may contain public data (e.g., the demographic data, the religious data, the ethnicity data, the interest data, the political affiliation data, the age data, the profession data and/or the charitable data) and/or the address data associated with each profile, based on which groups may be created in the support of the campaign in the geo-spatial social network 124.

In the example embodiment illustrated in FIG. 2, the wiki module 202 communicates with the edit module 204 and the public database 212. The lock module 206 communicates with the edit module 204 and the populating module 208. The information module 210 communicates with the populating module 208 and the public database 212, according to example embodiment of FIG. 2.

Each profile of the geo-spatial social network (e.g., the geo-spatial social network 124 of FIG. 1) may be populated with the address data. In addition, each profile of the geo-spatial social network 124 may be transformed into a wiki profile in which any data in the particular profile is editable by any user of the geo-spatial social network 124 until a particular user claims the particular profile at which time the particular profile becomes locked and/or the particular user who claims the particular profile decides who can view and/or edit the particular profile.

The address data may be seeded (e.g., with a telephone directory data compiled from public sources) prior to launching the geo-spatial social network 124 so as to seed interaction (e.g., using the interaction module 304 of FIG. 1) between group members of the geo-spatial social network 124 at launch of the geo-spatial social network 124 through both electronic and direct mail distribution channels. Political affiliation data may also be populated in the social network using publicly available sources.

Figure 3:
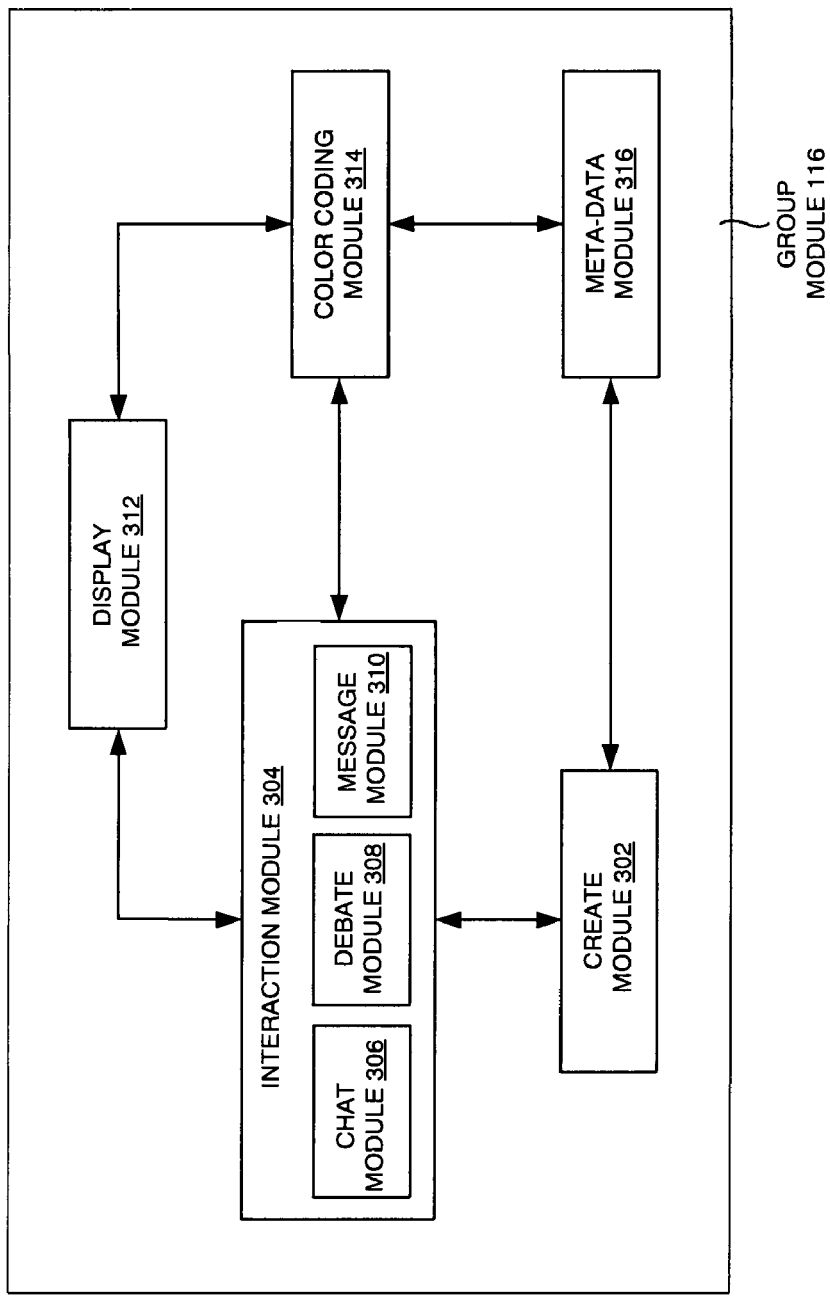
FIG. 3 is an exploded view of the group module of FIG. 1, according to one embodiment.

FIG. 3 is an exploded view of the group module 116 of FIG. 1, according to one embodiment. Particularly, FIG. 3 illustrates a create module 302, an interaction module 304, a chat module 306, a debate module 308, a message module 310, a display module 312, a color coding module 314 and a meta-data module 316, according to one embodiment.

The create module 302 may enable creation of a group in support of the campaign in the neighborhood. The interaction module 304 may allow interaction between members of the group of the geo-spatial social network 124 through both electronic and direct mail distribution channels. The members of the group may communicate with each other and/or the candidate through the chat module 306, the debate module 308 and/or the message module 310.

The chat module 306 and the message module 310 may enable the users of the geo-spatial social network 124 to share comments, thoughts and/or feedback on the certain candidates through the online forum and/or the physical mail communication during the online debate. The debate module 308 may generate the online debate between certain candidates in the campaign in multi-media form in the geo-spatial social network 124.

The display module 312 may display a three-dimensional neighborhood map that represents the group along with other residences and/or businesses that may surround the physical location of the group. The color coding module 314 may color code automatically the rooftop of the residence in the three dimensional neighborhood map to identify the affiliation of the resident as being associated with the particular group. The meta-data module 316 may manage the public data and/or the address data associated with the members of the group in the geo-spatial social network 124.

In the example embodiment illustrated in FIG. 3, the create module 302 communicates with the interaction module 304 and the meta-data module 316. The interaction module 304 includes the chat module 306, the debate module 308 and the message module 310. The message module 310 as illustrated in the example embodiment of FIG. 3 communicates with the display module 312 and color coding module 314. The color coding module 314 communicates with the meta-data module 316, according to the example embodiment illustrated in FIG. 3.

Groups may be created automatically based on the public data (e.g., the demographic data, the religion data, the ethnicity data, the interest data, the political affiliation data, the age data, the profession data, and/or the charitable contribution data) associated with each profile of the geo-spatial social network (e.g., the geo-spatial social network 124 of FIG. 1) even prior to certain users associated with each profile registering in the geo-spatial social network 124 by applying the public data to each profile.

An address data may be seeded (e.g., with telephone directory data compiled from public sources) prior to launching the geo-spatial social network 124 so as to seed interaction between group members of the geo-spatial social network 124 at launch of the geo-spatial social network 124 through both electronic and direct mail distribution channels. In addition, the rooftops of residences may be color coded automatically in the three-dimensional neighborhood map (e.g., the three dimensional neighborhood map 406 of FIG. 4) which represents the affiliation of the residents identified through the rooftops as being associated with the group.

Online debates may be generated between certain candidates in the campaign in multi-media form through a technique in which the users of the geo-spatial social network share comments, thoughts and/or feedback on the certain candidates while the online debates occur. In addition, live debates may be generated between the candidate and other candidates in the social network.

Figure 4:
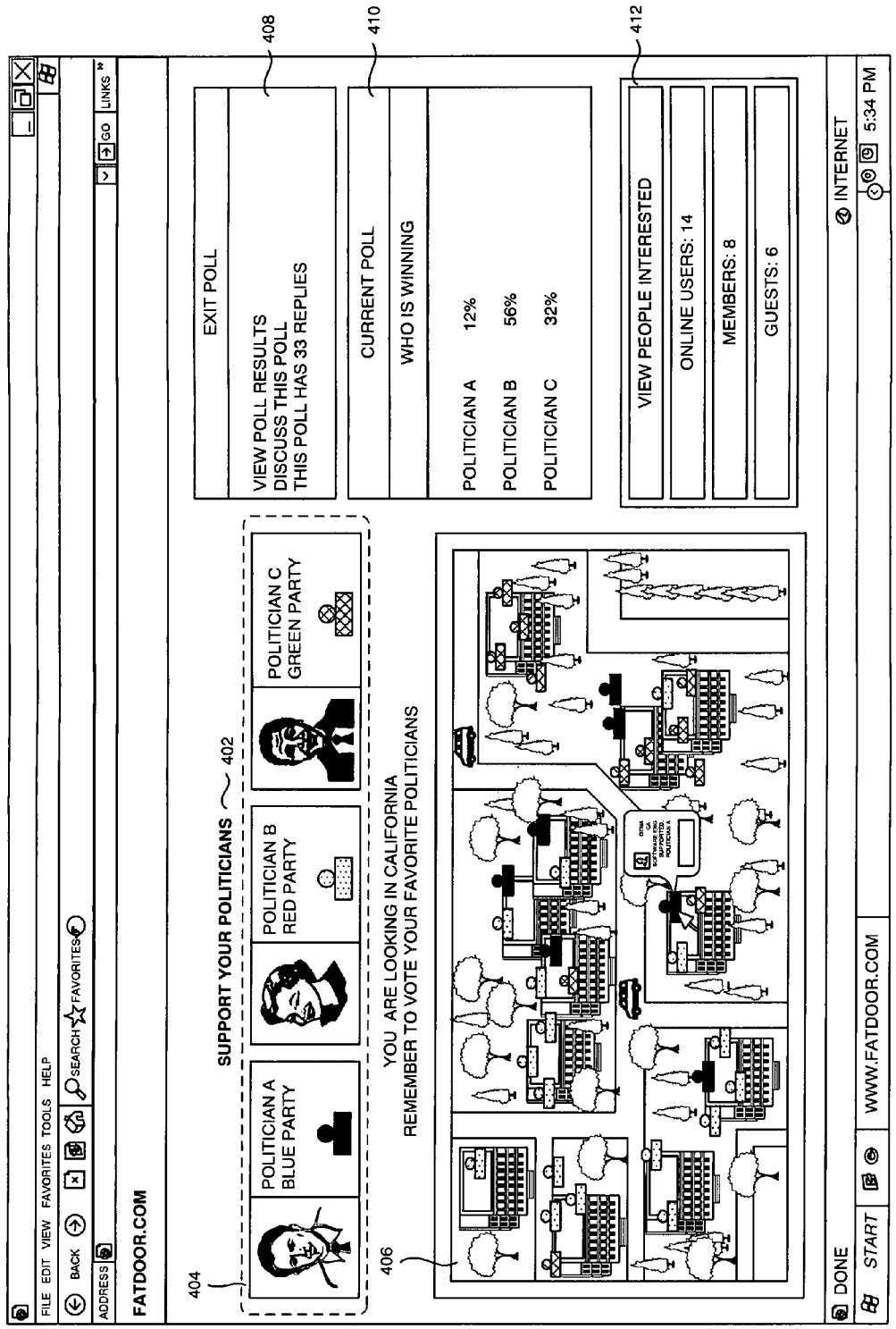
FIG. 4 is a user interface view of supporting candidates in the geo-spatial social network, according to one embodiment.

FIG. 4 is a user interface view of supporting candidates in the geo-spatial social network 124, according to one embodiment. Particularly, FIG. 4 illustrates a support your politicians label 402, a pictorial representation of politicians 404, a three dimensional neighborhood map 406, an exit poll link 408, a current poll label 410, and a view people interested label 412, according to one embodiment.

The support your politicians label 402 may provide a platform where users of the geo-spatial social network 124 may create group(s) in support of the campaign and/or may vote for a favorite politician in the neighborhood. The pictorial representation of politicians 404 may display the various candidates associated with the campaign in the geo-spatial social network 124. The three dimensional neighborhood map 406 may graphically visualize (e.g., on the map), the location of the members supporting the group in the neighborhood (e.g., the neighborhood 126A-N of FIG. 1).

The exit poll link 408 may provide the details of an exit poll in the geo-spatial social network 124 where the users of the geo-spatial social network 124 may exchange group opinion (s) with each other. The current poll label 410 may display real time poll standings in the live online debate in the geo-spatial social network 124. The view people interested label 412 may indicate the number of people interested in the groups created by the particular user(s) in support of the campaign. The people interested may include the members and/or guests in the geo-spatial social network 124.

In the example embodiment illustrated in FIG. 4, the user interface view may enable users of the geo-spatial social network 124 to form groups in support of the campaign. The members of the group representing the particular candidate may be indicated geo-spatially through the three dimensional neighborhood map 406. The user interface view may enable the users of the geo-spatial social network 124 to vote for their favorite politicians and/or may allow the users to participate in online debates to share comments, thoughts and/or feedback associated with the candidate.

Figure 5:
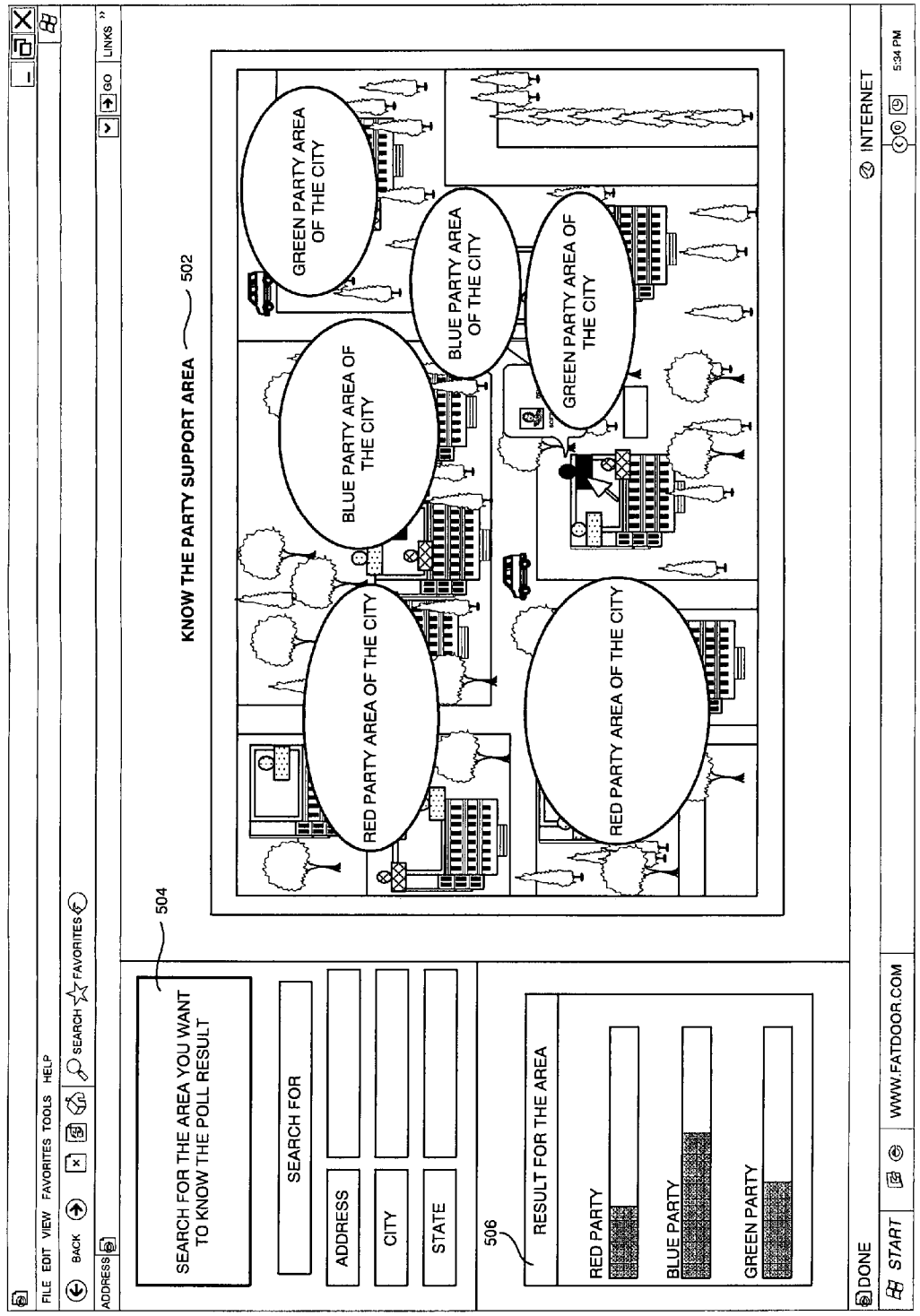
FIG. 5 is a user interface view of the campaign module of FIG. 1, according to one embodiment.

FIG. 5 is a user interface view of the campaign module 100 of FIG. 1, according to one embodiment. Particularly, FIG. 5 illustrates a know the party support area label 502, a search link 504 and a result label 506, according to one embodiment. The know the party support area label 502 may enable the user to visualize the location associated with the group(s) supporting the candidate in the neighborhood. The search link 504 may enable the users of the geo-spatial environment to search the location based on poll result of the campaign. The result label 506 may display the results of the poll which indicates the strength of the candidate in various locations of the social network. The result label 506 may display the time poll standings during the live online debate between the candidates in the geo-spatial social network 124.

In the example embodiment illustrated in FIG. 5, the user interface view may enable the users to search geo-spatially the strongest and/or weakest support areas for the groups created during campaign in the geo-spatial social network 124. The user may also search by location to know the results of the polls.

Figure 6:
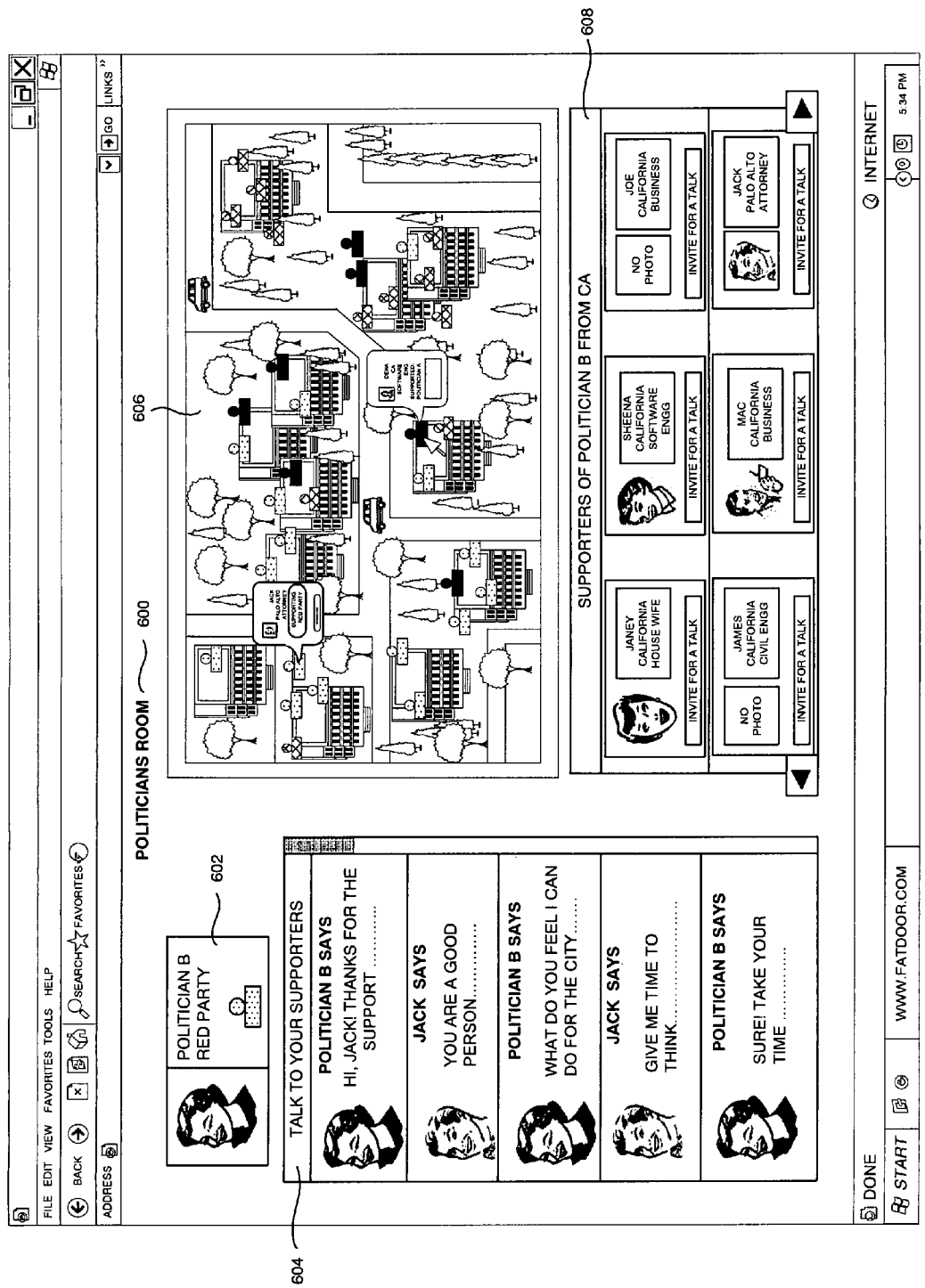
FIG. 6 is a user interface view of a politician room, according to one embodiment.

FIG. 6 is a user interface view of a politicians room 600, according to one embodiment. Particularly, FIG. 6 illustrates a user profile block 602, a chat box 604, the neighborhood environment 606 and a pictorial representation 608, according to one embodiment. The user profile block 602 may display the content information associated with the profile of the particular registered user. The chat box 604 may allow the members of the group to communicate with each other and/or the candidate(s) online in the geo-spatial social network 124. The neighborhood environment 606 may graphically visualize in the map, the neighborhood that may illustrate the particular location of the members of the group. The pictorial representation 608 may display the profile(s) associated with the supporters of the campaign tied to the particular location in the geo-spatial social network 124.

In the example embodiment illustrated in FIG. 6, the user interface view of politicians room 600 may enable the candidate(s) (e.g., the politicians 136 of FIG. 1) to generate an online debate with the other users in multi-media form in the geo-spatial social network 124. The user interface view of the politicians room 600 may enable the candidate(s) to graphically view the physical location associated with the members of the group and may also allow the supporters of the group to tag each home visited with meta-data in the geo-spatial social network 124. Also, the candidate(s) may view all the supporters associated with the particular location (e.g., a particular city).

Figure 7:
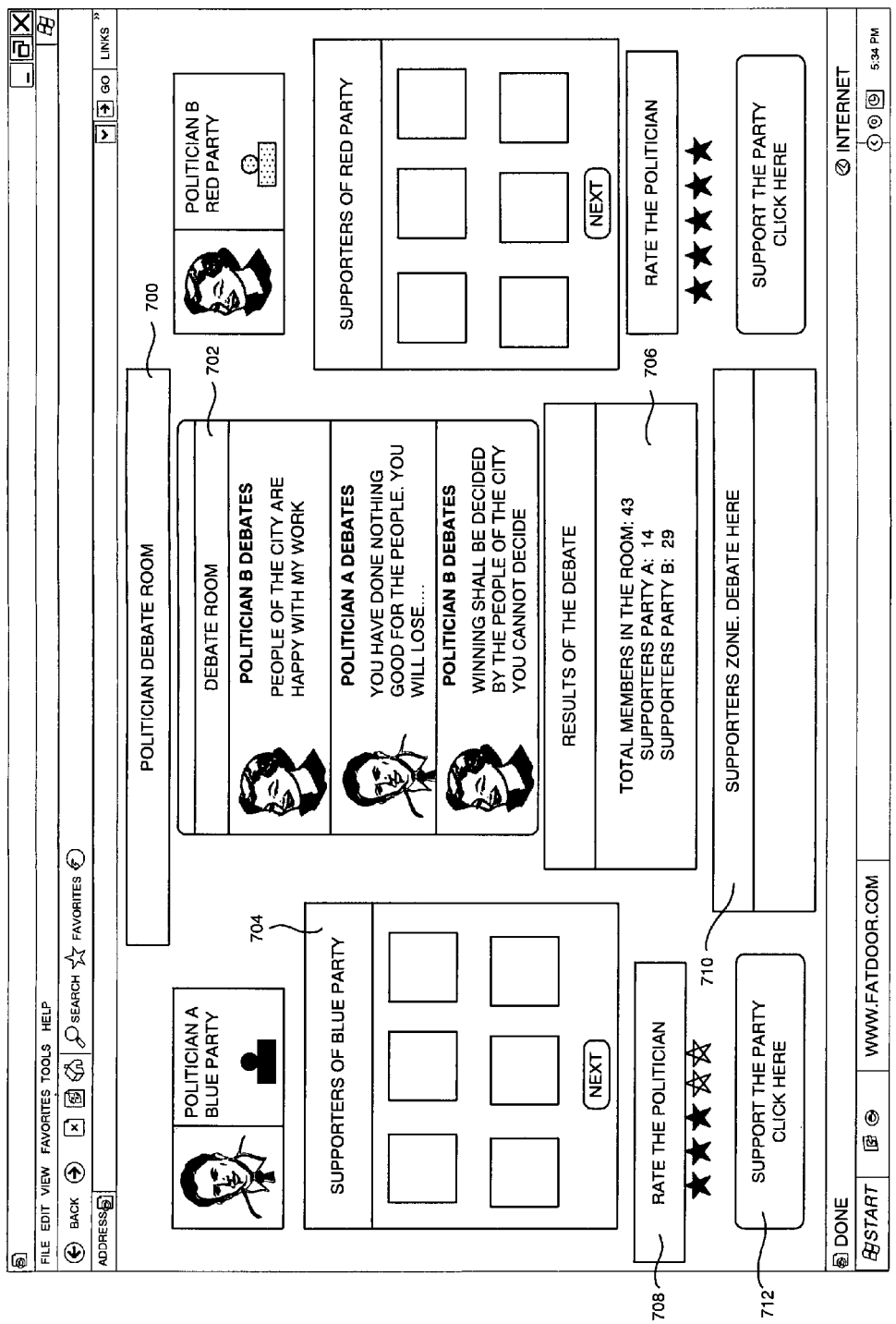
FIG. 7 is a user interface view of a politician debate room, according to one embodiment.

FIG. 7 is a user interface view of a politician debate room 700, according to one embodiment. Particularly, FIG. 7 illustrates a debate room 702, supporters of the party 704, a result of the debate block 706, a rate the politician option 708, a supporters zone 710 and a support the party zone 712, according to one embodiment.

The debate room 702 may generate the online debate between certain candidates (e.g., the politicians 136 of FIG. 1) in the campaign (e.g., in multi-media form). The supporters of the party 704 (e.g., supporters of the blue party and/or supporters of the red party) may display the list of profiles of the supporters (e.g., who support the particular politician) in the geo-spatial social network 124. The results of the debate block 706 may display results of the poll across the traditional and/or web based media in the geo-spatial social network 124. The results of the debate block 706 may allow the supporter of candidate to conduct the survey during the live debate between the candidate and other candidates in the social network and/or may enable the users to view the results obtained through the survey.

The rate the politician option 708 may enable the users to rate the politicians depending on the live debate (e.g., video conference) between the candidates in the geo-spatial social network 124. The supporters zone 710 may enable the members of the group to participate in the online debate. The support the party zone 712 may enable the users to support the candidate representing the particular party during the online debate.

In the example embodiment illustrated in FIG. 7, the user interface view of the politician debate room 700 may enable the user to participate in the online debate between the candidates representing the different parties. In addition, the politician debate room 700 may facilitate the user to rate the politician and support the party through rate the politician option 708 and support the party option 712 respectively. Also, the users can view the results of the online debate between the candidates of different parties through results of the debate block 706, according to the example embodiment illustrated in FIG. 7.

Figure 8:
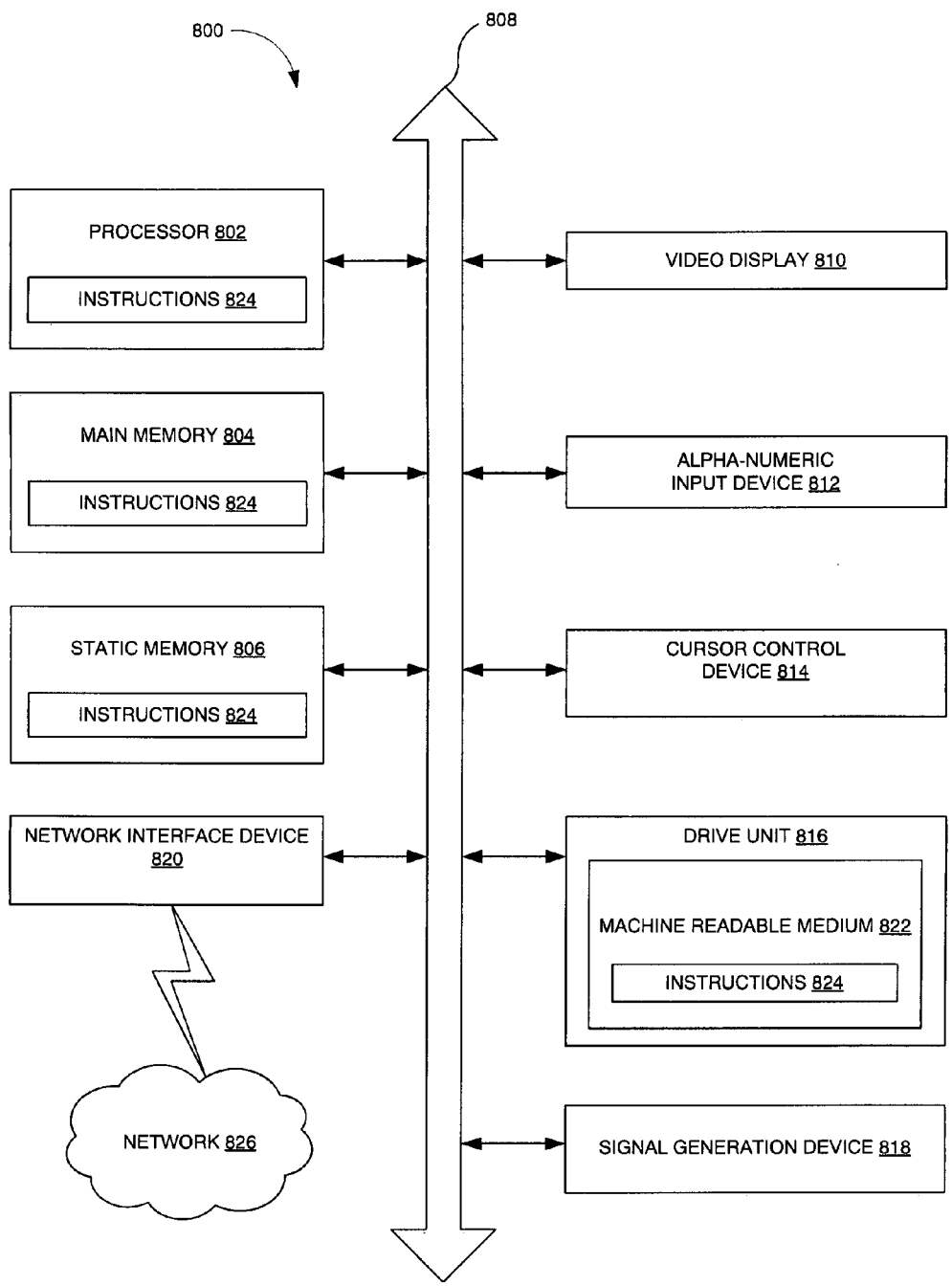
FIG. 8 is a diagrammatic system view of a data processing system in which any of the embodiments disclosed herein may be performed, according to one embodiment.

FIG. 8 is a diagrammatic system view 800 of a data processing system in which any of the embodiments disclosed herein may be performed, according to one embodiment. Particularly, the diagrammatic system view 800 of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824, and a network 826, according to one embodiment.

The diagrammatic system view 800 may indicate a personal computer and/or a data processing system in which one or more operations disclosed herein are performed. The processor 802 may be a microprocessor, a state machine, an application specific integrated circuit, a field programmable gate array, etc. (e.g., Intel® Pentium® processor). The main memory 804 may be a dynamic random access memory and/or a primary memory of a computer system.

The static memory 806 may be a hard drive, a flash drive, and/or other memory information associated with the data processing system. The bus 808 may be an interconnection between various circuits and/or structures of the data processing system. The video display 810 may provide graphical representation of information on the data processing system. The alpha-numeric input device 812 may be a keypad, a keyboard and/or any other input device of text (e.g., a special device to aid the physically handicapped). The cursor control device 814 may be a pointing device such as a mouse.

The drive unit 816 may be a hard drive, a storage system, and/or other longer term storage subsystem. The signal generation device 818 may be a bios and/or a functional operating system of the data processing system. The network interface device 820 may be a device that may perform interface functions such as code conversion, protocol conversion and/or buffering required for communication to and from the network 826. The machine readable medium 822 may provide instructions on which any of the methods disclosed herein may be performed. The instructions 824 may provide source code and/or data code to the processor 802 to enable any one/or more operations disclosed herein.

FIG. 9 is a table view showing the details of the supporters of the candidate in the geo-spatial social network 124, according to one embodiment. Particularly, FIG. 9 illustrates a user field 902, a address field 904, a group name field 906, a supporting the group field 908, a, a media delivered field 910, a chats field 912, a comments/remarks field 914 and an exit poll field 916, according to one embodiment.

The user field 902 may display name(s) of the member of the group supporting the campaign in the geo-spatial social network 124. The address field 904 may be the location meta-data (e.g., a city, a state, a zip code, an email id, etc.) associated with the member of the group formed in support of the campaign in the geo-spatial social network. The group name 906 may be the name of the group in support of the campaign.

The supporting the group field 908 may display the party associated with the candidate (e.g., politician) that the member of the group supports. The media delivered field 910 may display the media delivered to the physical location of the members of the groups. The chats field 912 may display the previous conversations between the members of the group in geo-spatial social network 124. The chat field may also show the recent conversations (e.g., live video chat, IM chat, etc.) between members of the group and the different politicians in the neighborhood. The comments/remarks field 914 may display the comments, thoughts and/or feedbacks based on opinions, impression and/or perspective of different candidates fighting the elections. The exit poll field 918 may display the poll opinions exchanged by the user 902 during the live presentation of the online debate in the geo-spatial social network 124.

In the example embodiment illustrated in FIG. 9, the user field 902 displays "Joy" in the first row and "Steve" in the second row of the user field column 902. The address field 904 displays "Palo Alto, Calif. and joy@gmail.com" in the first row and "Cupertino, Calif. and steve@yahoo.com" in the second row of the address field column 904. The group name 906 displays "politician A" in the first row and "politician B" in the second row of the group name field column 906. The supporting the group field 908 displays "blue party" in the first row and "green party" in the second row of the supporting the group field column 908. The media delivered field 910 displays "lawn sign, brochure, flyer" in the first row and "mailer, postcard, brochure" in the second row of the media delivered field column 910.

The chats field 912 displays "hi" in the first row and "how are you" in the second row of the chats field column 912. The comments/remarks field 914 displays "politician A doing well" in the first row and "politician B needs to improve" in the second row of the comments/remarks field column 914. The exit poll field 916 displays "yes" in the first row and "no" in the second row of the exit poll field column 916.

Figure 10:
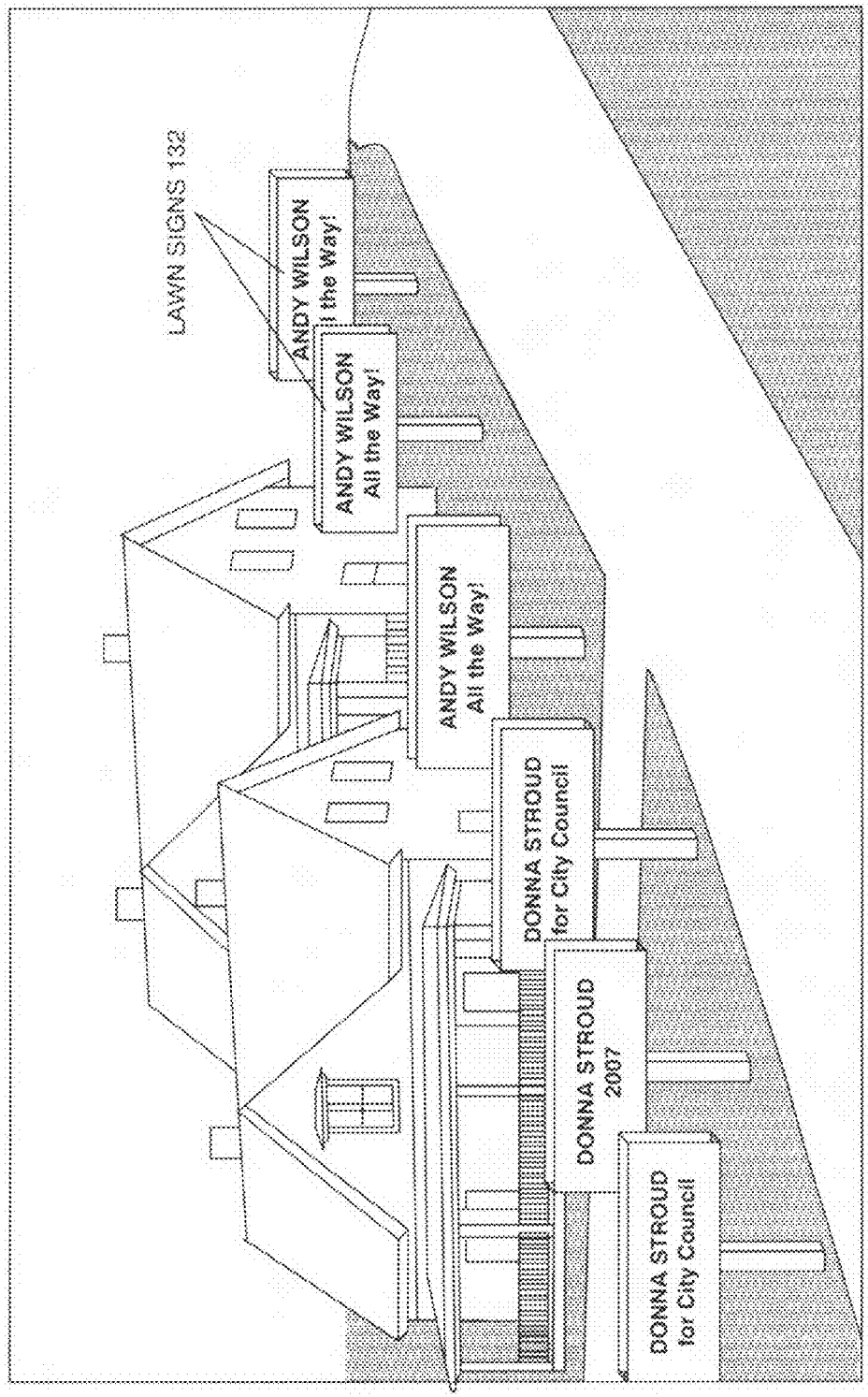
FIG. 10 is a pictoral view representing physical lawn signs installed at the doorsteps of a house in the neighborhood, according to one embodiment.

FIG. 10 is a pictorial view representing physical lawn signs installed at the doorsteps of a house in the neighborhood, according to one embodiment. In the example embodiment, FIG. 10 illustrates the lawn signs 132 installed at the physical location (e.g., location in the neighborhood associated with residences and/or businesses) of a member of a group (e.g., a group supporting a candidate) when the member elects to receive the lawn signs 132. The lawn signs representing the particular group (e.g., created in support of a campaign) may be delivered by delivery agencies (e.g., the delivery people 134 of FIG. 1) to the physical location of the member of the group based on the address data associated with the member's profile (e.g., on the geo-spatial social network 124).

Figure 11A:
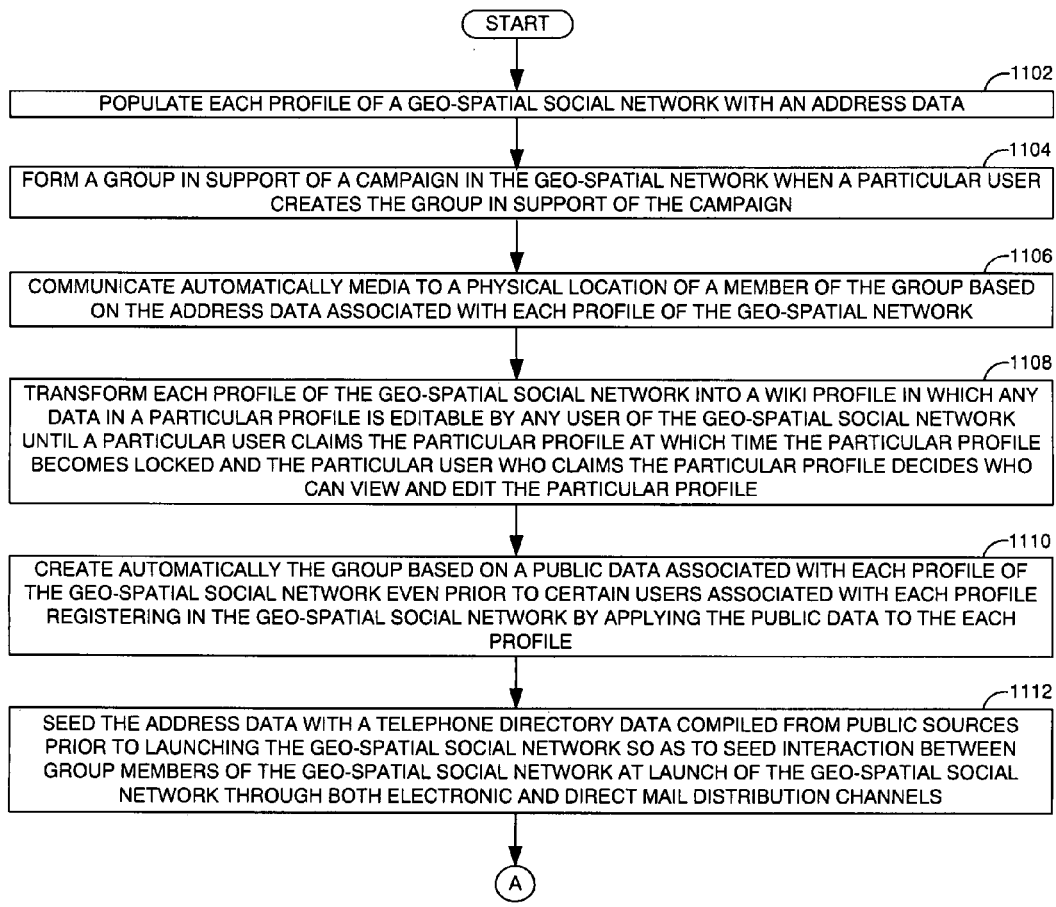
FIG. 11A is a process flow of the campaign module of FIG. 1, according to one embodiment.

FIG. 11A is a process flow of the campaign module 100 of FIG. 1, according to one embodiment. In operation 1102, each profile of a geo-spatial social network (e.g., the geo-spatial social network 124 of FIG. 1) may be populated with an address data. In operation 1104, a group may be formed in support of a campaign in the geo-spatial social network 124 when a particular user creates the group in support of the campaign (e.g., associated with a candidate). In operation 1106, media (e.g., the lawn signs 132 illustrated in FIG. 10) may be communicated automatically to a physical location (e.g., a residence) of a member of the group based on the address data associated with each profile of the geo-spatial social network 124.

In operation 1108, each profile of the geo-spatial social network 124 may be transformed into a wiki profile (e.g., using the wiki module 202 of FIG. 2) in which any data in a particular profile is editable by any user of the geo-spatial social network 124 until a particular user claims the particular profile at which time the particular profile becomes locked and the particular user who claims the particular profile decides who can view and edit the particular profile. In operation 1110, the group may be created automatically based on a public data (e.g., a demographic data, a religion data, an ethnicity data, an interest data, a political affiliation data, an age data, a profession data, and/or a charitable contribution data, etc.) associated with each profile of the geo-spatial social network 124 even prior to certain users associated with each profile registering in the geo-spatial social network 124 by applying the public data to the each profile.

In operation 1112, the address data may be seeded with a telephone directory data compiled from public sources prior to launching the geo-spatial social network 124 so as to seed interaction between group members of the geo-spatial social network 124 at launch of the geo-spatial social network 124 through both electronic and direct mail distribution channels.

Figure 11B:
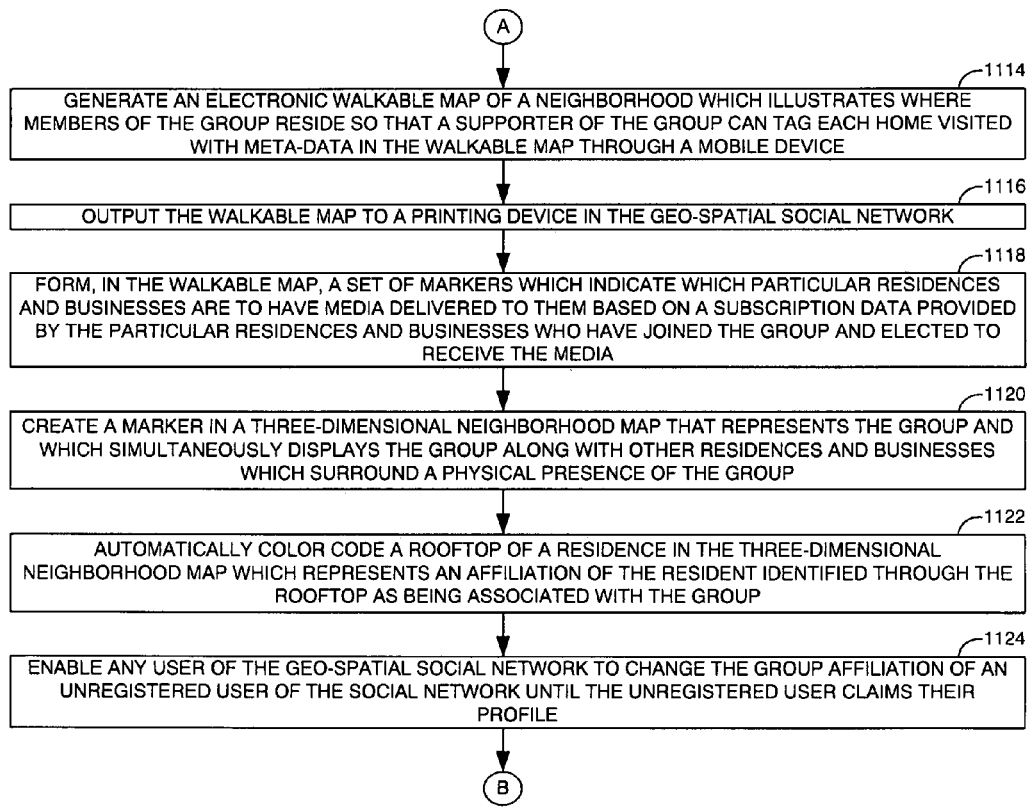
FIG. 11B is a continuation of the process flow of FIG. 11A showing additional processes, according to one embodiment.

FIG. 11B is a continuation of the process flow of FIG. 11A showing additional processes, according to one embodiment. In operation 1114, an electronic walkable map of a neighborhood may be generated to illustrate where members of the group reside so that a supporter of the group can tag each home visited with meta-data in the walkable map through a mobile device (e.g., a cell phone, a transmitter, etc.). In operation 1116, the walkable map may be outputted to a printing device in the geo-spatial social network 124. In operation 1118, a set of markers may be formed in the walkable map, to indicate which particular residences and businesses are to have media (e.g, the lawn signs 132 of FIG. 1) delivered to them based on a subscription data provided by the particular residences and businesses, who have joined the group and elected to receive the media.

In operation 1120, a marker may be created in a three-dimensional neighborhood map that represents the group and which simultaneously displays the group along with other residences and/or businesses which surround a physical presence of the group. In operation 1122, a rooftop of a residence in the three-dimensional neighborhood map may be color coded automatically which represents an affiliation of the resident identified through the rooftop as being associated with the group. In operation 1124, any user of the geo-spatial social network 124 may be enabled to change the group affiliation of an unregistered user of the social network (e.g., through a wiki profile associated with the unregistered user) until the unregistered user claims their profile.

Figure 11C:
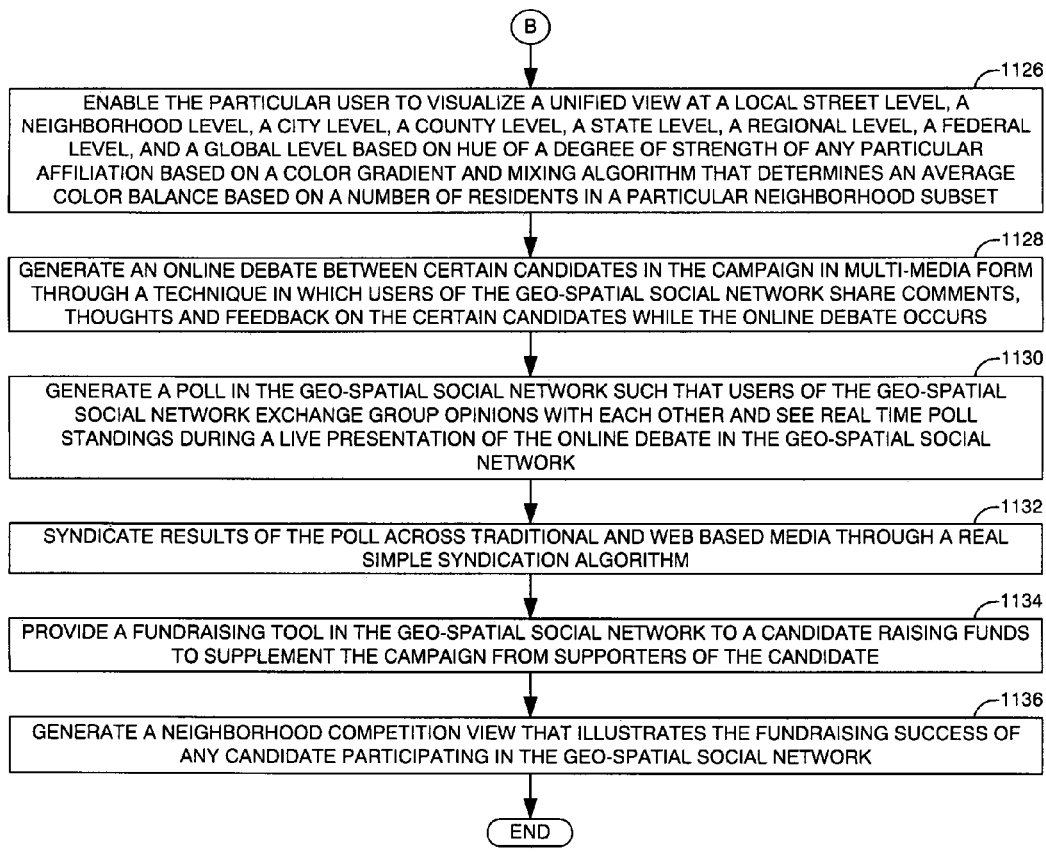
FIG. 11C is a continuation of the process flow of FIG. 11B showing additional processes, according to one embodiment.

FIG. 11C is a continuation of process flow of FIG. 11B showing additional processes, according to one embodiment. In operation 1126, the particular user may be enabled to visualize a unified view at a local street level, a neighborhood level, a city level, a county level, a state level, a regional level, a federal level, and/or a global level based on hue of a degree of strength of any particular affiliation based on a color gradient and mixing algorithm that determines an average color balance based on a number of residents in a particular neighborhood subset (e.g., group affiliations).

In operation 1128, an online debate may be generated between certain candidates (e.g., the politicians 136 of FIG. 1) in the campaign in multi-media form through a technique in which users of the geo-spatial social network 124 share comments, thoughts and/or feedback on the certain candidates while the online debate occurs. In operation 1130, a poll may be generated in the geo-spatial social network 124 such that users of the geo-spatial social network 124 exchange group opinions with each other and see real time poll standings during a live presentation of the online debate in the geo-spatial social network 124.

In operation 1132, results of the poll may be syndicated across traditional and/or web based media through a real simple syndication (e.g., RSS) algorithm. In operation 1134, a fundraising tool may be provided in the geo-spatial social network 124 to the candidate raising funds to supplement the campaign from supporters of the candidate (e.g., the politician(s) 136 of FIG. 1). In operation 1136, a neighborhood competition view may be generated to illustrate the fundraising success of any candidate participating in the geo-spatial social network 124.

Figure 12:
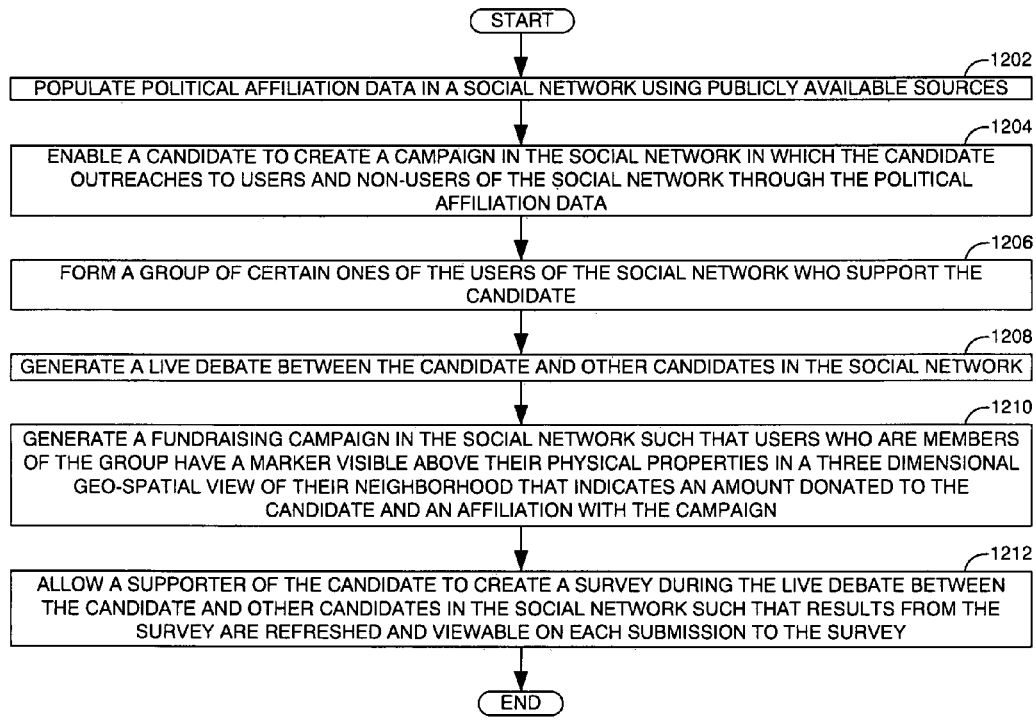
FIG. 12 is a process flow of generating a live debate between the candidates and other candidates in the social network, according to one embodiment.

FIG. 12 is a process flow generating a live debate between the candidates and other candidates in the social network, according to one embodiment. In operation 1202, political affiliation data may be populated in a social network using publicly available sources (e.g., directory information and/or listings, etc.). In operation 1204, a candidate (e.g., the politicians 136 of FIG. 1) may be enabled to create a campaign in the social network in which the candidate outreaches to users and/or non-users of the social network (e.g., the geo-spatial social network) through the political affiliation data. In operation 1206, a group of certain ones of the users of the social network who support the candidate may be formed.

In operation 1208, a live debate may be generated between the candidate and other candidates in the social network. In operation 1210, a fundraising campaign may be generated in the social network such that users who are members of the group have a marker visible above their physical properties (e.g., residences, houses, etc.) in a three dimensional geo-spatial view of their neighborhood that indicates an amount donated to the candidate and an affiliation with the campaign. In operation 1212, a supporter of the candidate may be allowed to create a survey during the live debate between the candidate and other candidates in the social network such that results from the survey are refreshed and viewable on each submission to the survey.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

For example, the campaign module 100, the fundraising module 102, the polling module 104, the syndication module 106, the delivery module 108, the audience module 110, the communication module 112, the profile module 114, the group module 116, the map module 118, the wiki module 202, the edit module 204, the lock module 206, the populating module 208, the information module 210, the create module 302, the interaction module 304, the chat module 306, the debate module 308, the message module 310, the display module 312, the color coding module 314, the meta-data module 316, and the other modules of FIGS. 1-12 may be enabled using a campaign circuit, a fundraising circuit, a polling circuit, a syndication circuit, a delivery circuit, an audience circuit, a communication circuit, a profile circuit, a group circuit, a map circuit, a wiki circuit, an edit circuit, a lock circuit, a populating circuit, an information circuit, a create circuit, an interaction circuit, a chat circuit, a debate circuit, a message circuit, a display circuit, a color coding circuit, a meta-data circuit and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system:, and may be performed in any order. Accordingly, the specification and drawings are to be regarded in an illustrative rather than a restrictive sense.

What is claimed is:

1. A method comprising:
   populating each profile of a geo-spatial social network with an address data;
   transforming each profile of the geo-spatial social network into a wiki profile in which any data in a particular profile is editable by any user of the geo-spatial social network until a particular user claims the particular profile at which time the particular profile becomes locked and the particular user who claims the particular profile decides who can view and edit the particular profile;
   forming a group in support of a campaign in the geo-spatial social network when a particular user creates the group in support of the campaign; and
   automatically communicating media to a physical location of a member of the group based on the address data associated with each profile of the geo-spatial social network.

2. The method of claim 1 wherein the campaign is at least one of a political campaign, a charitable campaign, a religious campaign, and a fundraising campaign.

3. The method of claim 1 further comprising automatically creating the group based on a public data associated with each profile of the geo-spatial social network even prior to certain users associated with each profile registering in the geo-spatial social network by applying the public data to the each profile.

4. The method of claim 3 wherein the public data is at least one of a demographic data, a religion data, an ethnicity data, an interest data, a political affiliation data, an age data, a profession data, and a charitable contribution data.

5. The method of claim 4 further comprising seeding the address data with a telephone directory data compiled from public sources prior to launching the geo-spatial social network so as to seed interaction between group members of the geo-spatial social network at launch of the geo-spatial social network through both electronic and direct mail distribution channels.

6. The method of claim 1 further comprising:
   generating an electronic walkable map of a neighborhood which illustrates where members of the group reside so that a supporter of the group can tag each home visited with meta-data in the walkable map through a mobile device; and
   outputting the walkable map to a printing device in the geo-spatial social network.

7. The method of claim 6 further comprising:
   forming, in the walkable map, a set of markers which indicate which particular residences and businesses are to have media delivered to them based on a subscription data provided by the particular residences and businesses who have joined the group and elected to receive the media, wherein the media is at least one of a lawn sign, a flyer, a mailer, a postcard, a brochure, a magazine, and a newsletter.

8. The method of claim 1 further comprising creating a marker in a three-dimensional neighborhood map that represents the group and which simultaneously displays the group along with other residences and businesses which surround a physical presence of the group.

9. The method of claim 8 further comprising automatically color coding a rooftop of a residence in the three-dimensional neighborhood map which represents an affiliation of the resident identified through the rooftop as being associated with the group.

10. The method of claim 9 further comprising enabling any user of the geo-spatial social network to change the group affiliation of an unregistered user of the social network until the unregistered user claims their profile.

11. The method of claim 10 further comprising enabling the particular user to visualize a unified view at a local street level, a neighborhood level, a city level, a county level, a state level, a regional level, a federal level, and a global level based on hue of a degree of strength of any particular affiliation based on a color gradient and mixing algorithm that determines an average color balance based on a number of residents in a particular neighborhood subset.

12. The method of claim 1 further comprising generating an online debate between certain candidates in the campaign in multi-media form through a technique in which the users of the geo-spatial social network share comments, thoughts and feedback on the certain candidates while the online debate occurs.

13. The method of claim 12 further comprising:
   generating a poll in the geo-spatial social network such that users of the geo-spatial social network exchange group opinions with each other and see real time poll standings during a live presentation of the online debate in the geo-spatial social network; and syndicating results of the poll across traditional and web based media through a real simple syndication algorithm.

14. The method of claim 13 further comprising:
providing a fundraising tool in the geo-spatial social network to a candidate raising funds to supplement the campaign from supporters of the candidate; and
generating a neighborhood competition view that illustrates the fundraising success of any candidate participating in the geo-spatial social network.

15. A system comprising:
a campaign module to automatically generate a visualization of areas of a particular neighborhood in which support of a candidate is strongest and weakest based on a membership in a group associated with supporters of the candidate in the particular neighborhood and in surrounding neighborhoods;
a communication module to allow members of the group to communicate with each other and the candidate through at least one of a debate forum, an online forum, a physical mail communication, and an electronic communications communication; and
a delivery module to coordinate fulfillment of the physical mail communication through a geo-spatial social network wherein each profile of the geo-spatial social network is editable by any user of the geo-spatial social network until a particular user claims the particular profile at which time the particular profile becomes locked and the particular user who claims the particular profile decides who can view and edit the particular profile.

16. The system of claim 15 further comprising an audience module to pre-populate a set of wiki profiles with public data having location information of residents of the particular neighborhood such that communication occurs between residents of the particular neighborhood through the physical mail communication regardless of whether the residents join the geo-spatial social network.

17. A method comprising:
populating political affiliation data in a social network using publicly available sources;
enabling a candidate to create a campaign in the social network in which the candidate outreaches to users and non-users of the social network through the political affiliation data;
forming a group of certain ones of the users of the social network who support the candidate; and
generating a live debate between the candidate and other candidates in the social network wherein each profile of the geo-spatial social network is editable by any user of the geo-spatial social network until a particular user claims the particular profile at which time the particular profile becomes locked and the particular user who claims the particular profile decides who can view and edit the particular profile.

18. The method of claim 17 further comprising generating a fundraising campaign in the social network such that users who are members of the group have a marker visible above their physical properties in a three dimensional geo-spatial view of their neighborhood that indicates an amount donated to the candidate and an affiliation with the campaign.

19. The method of claim 17 further comprising allowing a supporter of the candidate to create a survey during the live debate between the candidate and other candidates in the social network such that results from the survey are refreshed and viewable on each submission to the survey.

* * * * *